US006262953B1

(12) United States Patent
Kahlman et al.

(10) Patent No.: US 6,262,953 B1
(45) Date of Patent: Jul. 17, 2001

(54) APPARATUS FOR READING AND/OR WRITING INFORMATION FROM/ON A RECORDING MEDIUM

(75) Inventors: Josephus A. H. M. Kahlman; Gerard E. Van Rosmalen, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/167,703

(22) Filed: Oct. 6, 1998

(30) Foreign Application Priority Data

Oct. 6, 1997 (EP) ................................................ 97203062

(51) Int. Cl.[7] ........................................................ G11B 7/09
(52) U.S. Cl. ................................. 369/44.11; 369/44.14; 369/44.35
(58) Field of Search .................................. 369/13, 44.11, 369/44.14, 44.28, 44.29, 44.35, 44.25; 360/114

(56) References Cited

U.S. PATENT DOCUMENTS 5,191,562 * 3/1993 Hensing et al. ...................... 369/13
5,293,360 * 3/1994 Hasegawa et al. .................... 369/13

FOREIGN PATENT DOCUMENTS

0291911 A2   11/1988   (EP) .
0793220 A2    9/1997   (EP) .

OTHER PUBLICATIONS

"Principles of Optical Disk Systems", G. Bouwhuis et al., 1985, ISBN-0-85274-785-3.

* cited by examiner

Primary Examiner—Thang V. Tran
(74) Attorney, Agent, or Firm—Michael E. Belk (57) ABSTRACT

An optical disk drive for reading and/or writing information from/on an optical disk includes an auxiliary lens to compensate for optical aberrations and a servo loop for positioning the auxiliary lens relative to a main lens. The servo loop includes an actuator for driving the auxiliary lens and a controller to feed the actuator coil with a drive current dependent on a position signal which is derived from the actual inductance of the actuator coil and a reference signal which indicates a desired position of the scan element. The disk drive also includes an inductance influencing device to vary the inductance of the actuator coil as a function of the position of the scan element.

13 Claims, 5 Drawing Sheets

APPARATUS FOR READING AND/OR WRITING INFORMATION FROM/ON A RECORDING MEDIUM

FIELD OF THE INVENTION

The invention relates to the field of actuator coil positioning systems such as those used to position a lens of an optical disc drives.

BACKGROUND OF THE INVENTION

The invention relates to an apparatus for reading and/or writing information from/on a recording medium, comprising a scan element for scanning the medium and a servo loop for positioning said scan element, said servo loop comprising an actuator for driving the scan element, said actuator comprising an actuator coil and a control means conceived to feed the actuator coil with a drive current dependent on a position signal which is indicative of the actual position of the scan element and a reference signal which is indicative of the desired position of the scan element.

The invention also relates to an actuator for an apparatus for reading and/or writing information from/on a recording medium, which actuator comprises an actuator coil and a magnetic member.

The invention further relates to a control means for driving an actuator coil in order to position a scan element in an apparatus for reading and/or writing information from/on a recording medium, the control means being conceived to feed the actuator coil with a drive current dependent on a position signal which is indicative of the actual position of the scan element and a reference signal which is indicative of the desired position of the scan element.

Such an apparatus is known from JP-A-08212579. The known apparatus is an optical drive for reading and or writing information on an optical disk. The apparatus comprises an optical head with an objective lens and a so called Solid Immersion Lens (SIL). The objective lens is positioned relative to the disc by means of a first actuator. The SIL is positioned relative to the objective lens by means of a second actuator which is operative between the objective lens and the SIL. In order to derive a position signal indicative of the position of the SIL relative to the objective lens, the capacitance of a capacitor formed by a holder of the SIL and a holder of the objective lens is measured.

The above citations are hereby incorporated in whole by reference.

SUMMARY OF THE INVENTION

The inventors recognize that a disadvantage of this measurement is that it imposes additional requirements on the construction of the optical head, which are difficult to meet because of the small dimensions of such a SIL.

It is an object of the invention to provide an apparatus, an actuator and a circuit for driving an actuator coil as defined above which overcome said disadvantage. To this end the apparatus according to the invention is characterized in that the apparatus comprises an inductance influencing means to vary the inductance of the actuator coil as a function of the position of the scan element and the control means are conceived to derive the position signal from the actual inductance of the actuator coil.

A first advantage of these measures is that no additional wires are required. A second advantage is that the measurement of the inductance of the actuator coil is less influenced by other parameters such as the actual position and length of wires than a measurement of the capacitance between two lens holders. As a result, there is more freedom of design and the quality of the position signal is much better so that the scan element can be positioned more accurately with the servo loop.

The measure as defined in dependent claim 2 has the advantage that the bandwidth of the servo loop can be large because the influence of an electrically conductive and non-magnetic material on the inductance of the actuator coil is not affected by the magnetic field resulting from the drive current fed through the actuator coil. Such a material is for example copper, aluminum or silver. When an inductance influencing means comprising a electrically and non-magnetic material approaches the actuator coil, the magnetic field from the actuator coil causes eddy currents in this material. These eddy currents result in a magnetic field opposing the magnetic field generated by the actuator coil and in a reduction of the actuator coil inductance.

Usually an inductance influencing means comprising a magnetic material such as ferrite or iron is used in order to influence the inductance of a coil. Use of such a material results in an increase of the inductance of a coil when the inductance influencing means and the actuator coil approach each other. It has been found that the influence of such a material on the inductance of the actuator coil is affected by the drive current through the actuator coil. This results in so called magnetic cross-talk from the drive current via the magnetic material to the position signal. The mechanism causing this magnetic cross-talk is based on the fact that magnetic materials have a relative magnetic permeability which depends on the magnetic field strength imposed on them. This magnetic cross-talk limits the bandwidth in which the servo loop for positioning the scan element can be used.

Another advantage of the measure as defined in dependent claim 2 is that an electrically conductive and non-magnetic element can easily be implemented in an actuator and can have a second function for example as a mounting ring.

The measure as defined in dependent claim 3 has the advantage that the measurement current results in a cyclic voltage variation across the actuator coil, the amplitude and the phase of this variation being indicative of the inductance of the actuator coil and hence being suitable as a position signal. Such a position signal in the form of a cyclic measurement voltage can easily be separated from voltage variations due to variations of the drive current, for example with a synchronous detector or a bandpass filter. By this separation so called electric cross-talk from the drive current to the position signal can be counteracted. Such electric cross-talk also limits the bandwidth of the servo loop for positioning the scan element and therefore should preferably be prevented.

The measure as defined in dependent claim 4 has the advantage that voltage variations at the measurement frequency due to a change of the actuator coil inductance can be separated from voltage variations resulting from variations of the drive current with simple means such as a high-pass filter.

An actuator usually comprises a magnetic member such as a permanent magnet and in many cases also a ferromagnetic flux guide. The measure as defined in dependent claim 5 has the advantage that, at the measurement frequency, the interaction between such a magnetic element and the actuator coil is reduced so that magnetic cross-talk from the drive current to the position signal is counteracted. As a result, the servo loop can be used in a much larger frequency range and the scan element can be positioned with a far better accuracy. Preferably, the actuator does not comprise magnetic flux guides so that only permanent magnetic members have to be shielded.

The measure as defined in dependent claim 6 has the advantage that the penetration depth of the electromagnetic waves resulting from the measurement current in an electrically conductive material is so small that a metal foil suffices to shield the magnetic member or members. Such a foil is attractive as it hardly influences the dimensions and the weight of the actuator or the scan element. In addition, such a foil can also act as the inductance influencing means. Hence, the addition of such a foil to an existing actuator makes the actuator very suitable for use in an appraratus according to the invention.

The measure as defined in dependent claim 7 has the advantage that the measurement current through the actuator coil is always amplified by resonance so that the measurement voltage indicative of the inductance of the actuator coil is also amplified. This amplification results in an improved signal to noise ratio of the position signal so that the scan element can be positioned more accurately. Another advantage of the measure of dependent claim 7 is that the actual measurement frequency is indicative of the position of the scan element. A position signal of which the frequency is indicative of the position of the scan element is very attractive because the information regarding the position is not affected by amplification or attenuation.

The measure as defined in dependent claim 8 has the advantage over the former embodiment that the servo loop is very accurate and very robust because the frequency of a signal is not influenced by amplification or attenuation. Hence, the relation between the reference signal and the actual position of the scan element is very reliable. Preferably, the reference signal is generated by means of a voltage controlled oscillator.

The invention can very advantageously be applied in an apparatus as defined in dependent claim 9. The invention is advantageous for positioning an auxiliary lens relative to a main lens in an optical disk drive because such an auxiliary lens is very small and light and there is only very little space available for means for detecting the position of the auxiliary lens. Such an auxiliary lens must be positioned very accurately relative to the main lens in order to compensate for optical aberrations. Moreover, such a main lens is usually driven by another actuator to actively follow movements of the disk, so that avoidance of extra wires and weight is a great advantage, and a high accuracy of the servo loop for positioning the auxiliary lens is required in order to be able to follow the movements of the main lens.

The invention is also of great advantage in an apparatus as defined in dependent claim 10 because no additional wires and only very little additional weight are required for the detection of the position of the scan mirror. Hence, the scan mirror can be moved at a high speed and a high scan speed can be obtained.

The actuator according to the invention is characterized in that the magnetic member is shielded for an electromagnetic wave with a frequency in the range of 100 kHz to 10 MHz by means of a electrically conductive and substantially non-magnetic material. Such an actuator is very suitable for use in an apparatus according to the invention because the distance between the actuator coil and the electrically conductive and substantially non-magnetic material can easily be determined by measuring the inductance of the actuator coil.

The control means according to the invention is characterized in that the control means are conceived to derive the position signal from the actual inductance of the actuator coil.

BRIEF DESCRIPTION OF THE DRAWINGS

Other alternatives and advantages of the inventions herein will be disclosed or become obvious to those skilled in the art by studying the detailed description below with reference to the following drawings which illustrate the elements of the appended claims of the inventions.

DETAILED DESCRIPTION OF THE PREFERRED EMBODIMENTS

Figure 1:
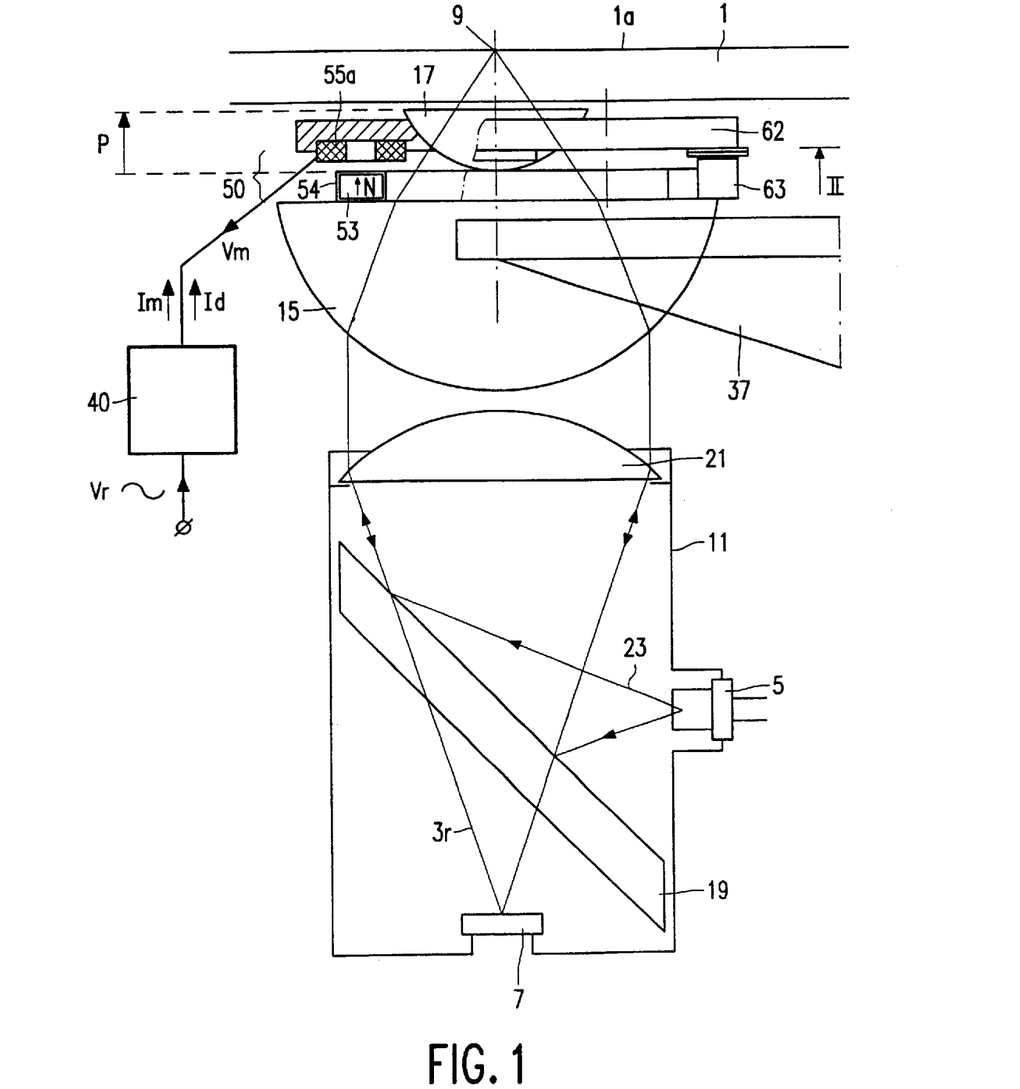
FIG. 1 shows the essential elements of a first embodiment of the apparatus according to the invention.

FIG. 1 shows the essential elements of a first embodiment of the apparatus according to the invention. It is an apparatus for reading and/or writing information from/on a recording medium, in this case an optical disk 1. The apparatus comprises a main lens 15 and an auxiliary lens 17 to scan the information layer 1a on the disk 1 with a laser beam 3. The laser beam 3 is generated by a laser 5, is reflected by a semi-transparent mirror 19 and is focused in a focus 9 by means of a collimating lens 21, the main lens 15 and the auxiliary lens 17. After being reflected by the information layer 1a, the laser beam partly travels through the semi-transparent mirror 19 and is detected by a detector 7. In order to follow movements of the disk 1, the apparatus comprises a first servo loop (not shown) to position the objective lens 15 via an actuator (not shown) operative on the lens holder 37. Such a servo loop is for example described in the Applicant's co-pending application PHN 16.566 and in *Principles of Optical Disk Systems; G. Bouwhuis et al,* 1985; ISBN 0-85274-785-3.

In order to compensate for optical aberrations, the position p of the auxiliary lens 17 relative to the main lens 15 can be adjusted by means of a second servo loop. The second servo loop comprises an actuator 50 operative between the main lens 15 and the auxiliary lens 17. The actuator 50 comprises an actuator coil 55a connected to the auxiliary lens 17 and a permanent magnetic ring 53 connected to the main lens 15. The second servo loop further comprises control means 40 conceived to feed the actuator coil 55a with a drive current Id dependent on a signal Vm which contains information about the actual position p of the auxiliary lens 17 and a reference signal Vr which is indicative of a desired position of the auxiliary lens 17. The permanent magnetic ring 53 is shielded with a copper foil 54 having a thickness of 0.1 mm so that the magnetic ring 53 is shielded for electromagnetic waves with a frequency above 0.5 MHz. This copper foil 54 also acts as an electrically conductive and non-magnetic material for reducing the inductance of said actuator coil 55a when the copper foil 54 and the actuator coil 53a approach each other so that the inductance of the actuator coil 55a varies as a function of the position p of the auxiliary lens 17 relative to the main lens 15.

Figure 2:
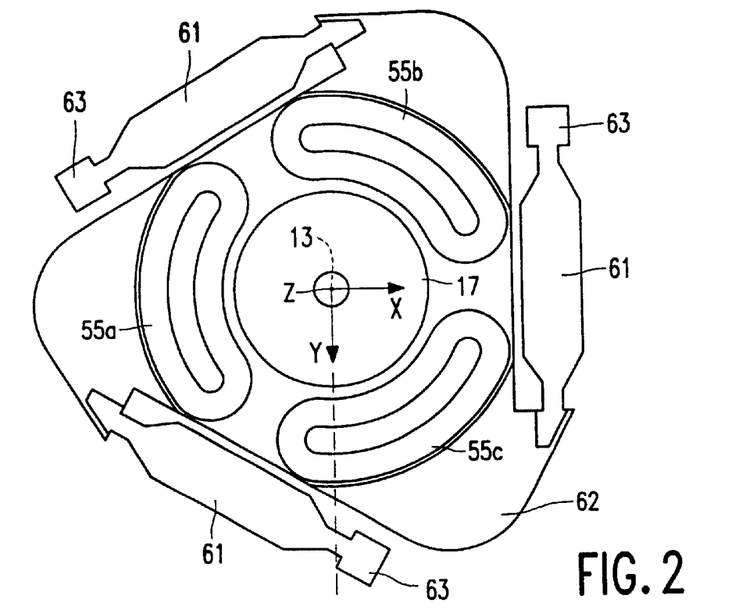
FIG. 2 shows a top view of an actuator in this first embodiment.

FIG. 2 shows a top view of the actuator 50. The actuator 50 comprises actuator coils 55a, 55b, 55c and a permanent magnetic ring 53. The actuator coils 55a, 55b and 55c are mounted on a holder 62 which carries the auxiliary lens 17 and which is connected to the main lens 15 via leaf springs 61 and connecting elements 63. More detailed information about the actuator 50 can be found in the Applicant's co-pending application PHN 16.557 which is hereby incorporated by reference.

Figure 3:
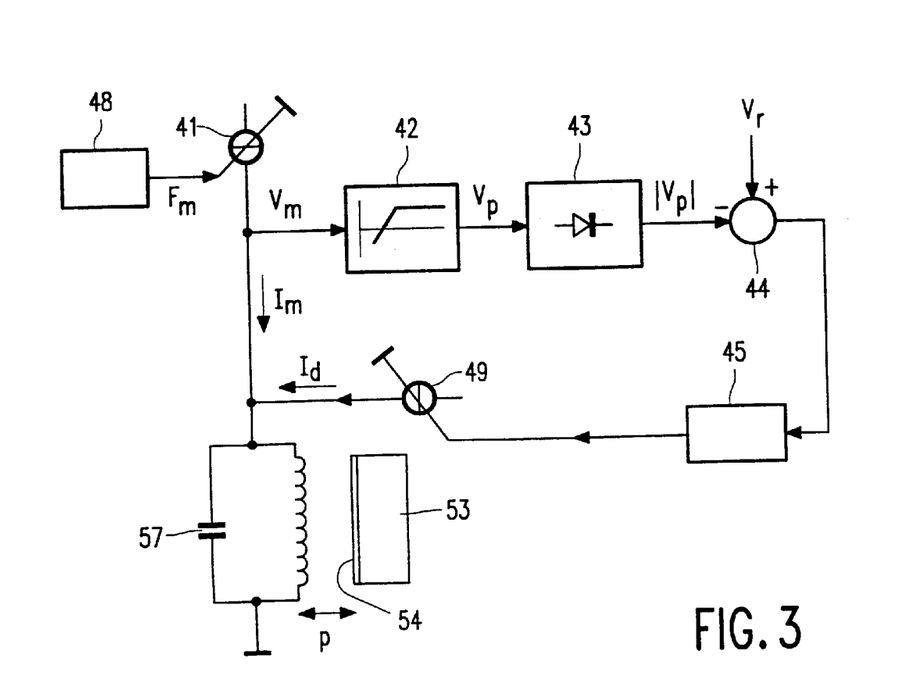
FIG. 3 shows a diagrammatic representation of a first example of a servo loop for positioning an auxiliary lens.

FIG. 3 shows a diagrammatic representation of a first example of the servo loop for positioning the auxiliary lens 17. The servo loop comprises a control means, the actuator coil 55a, the magnetic ring 53 and the copper foil 54. The control means comprise an oscillator 48, a controllable current source 41 to generate a measurement current Im, a high pass filter 42, an amplitude detector 43, a comparator 44, a lead network 45, a controllable current source 49 to generate a drive current Id for adjusting the position of the auxiliary lens 17 by means of the actuator 50. The servo loop has a cut-off frequency of approximately 1 kHz.

The servo loop further comprises a resonant circuit consisting of the actuator coil 55a and a capacitor 57. The inductance L of the actuator coil is for example in the range of 15–20 microH and the capacitance C of the capacitor is for example 100 pF so that the resonant frequency Fres of the resonant circuit is about 4 MHz (Fres=1/(2*Pi)*SQRT (1/(L*C)). Hence, in this embodiment the frequency Fm of the measurement current Im is more than 2 thousand times the cut-off frequency of the servo loop for positioning the auxiliary lens.

As the inductance L of the actuator coil varies as a function of the position p of the auxiliary lens 15, the resonant frequency Fres also varies as a function of the position p of the auxiliary lens 15. In order to detect this shift in resonant frequency, the oscillator 48 generates a signal with a measurement frequency Fm which is near the resonant frequency Fres. This signal controls a current source 41 for feeding a cyclic measurement current Im through the actuator coil 55a. The voltage at the measurement frequency Fm becomes larger when the resonant frequency Fres approaches the measurement frequency. Hence, the amplitude of this voltage is indicative of the position p of the auxiliary lens 17. Therefore, the control means further comprises the high pass filter 42 to filter out voltage due to the drive current Id from the voltage Vm across the actuator coil 55a and to pass voltage at the measurement frequency Fm. The output of the high pass filter 42 is applied to the amplitude detector or rectifier 43, which converts the amplitude of the voltage at the measurement frequency Fm into a DC signal |Vp| which is indicative of the position of the auxiliary lens 17.

The comparator 44 serves to compare the position signal |Vp| with a signal Vr indicative of a desired position of the auxiliary lens 17 relative to the main lens 15. The difference between the signals |Vp| and Vr is passed through a lead network 45 to obtain a stable servo loop and thereafter converted to a drive current Im by means of the controllable current source 49.

Figure 4:
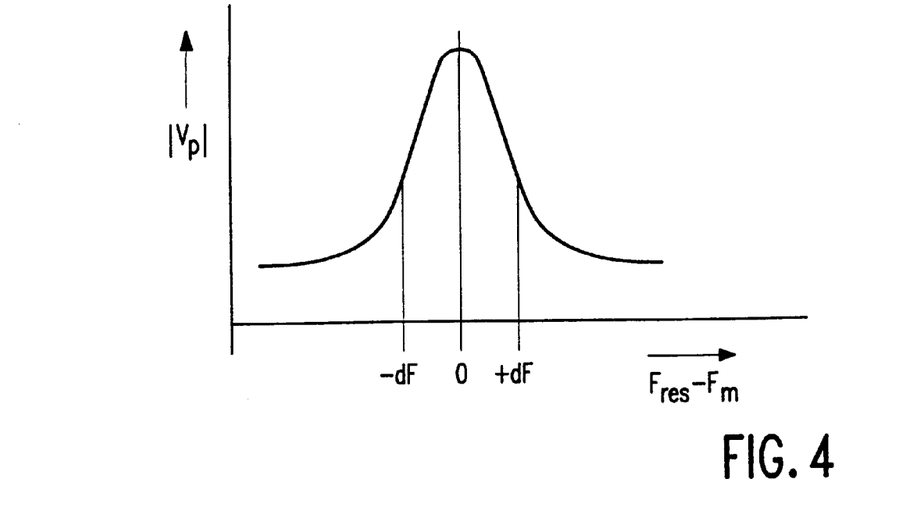
FIG. 4 shows a position signal as a function of the difference between the a resonant frequency and the frequency of a measurement current.

FIG. 4 shows the position signal |Vp| as a function of the difference between the resonant frequency Fres and the frequency Fm of the measurement current Im. From this Figure it can be seen that the position signal |Vp| will vary monotonically as a function of the resonant frequency Fm and hence as a function of the position p when this difference is near –dF or near +dF.

Figure 5:
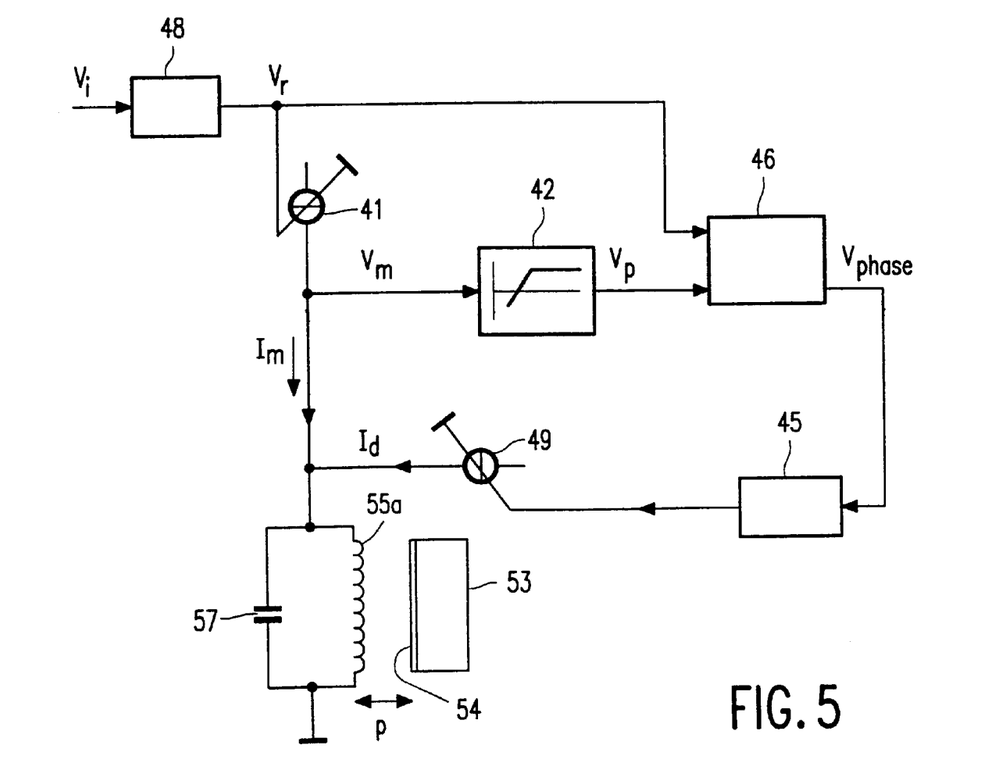
FIG. 5 shows a diagrammatic representation of a second example of the servo loop for positioning the auxiliary lens.

FIG. 5 shows a diagrammatic representation of a second example of the servo loop for positioning the auxiliary lens 17. This servo loop comprises the same actuator coil 55a, magnetic ring 53 and copper foil 54 but different control means. The control means comprise an voltage controlled oscillator 48a, a controllable current source 41 to generate a measurement current Im, a high pass filter 42, a phase detector 46, a loop filter 47 and a controllable current source 49 to generate a drive current Im for adjusting the position of the auxiliary lens 17 by means of the actuator 50. The servo loop also comprises the resonance circuit incorporating said actuator coil 55a and capacitor 57. The servo loop for positioning the auxiliary lens 17 is conceived to position the auxiliary lens 17 in such a manner that the resonant frequency of the resonant circuit approaches the frequency of the reference signal. This is explained hereafter.

The voltage controlled oscillator 48a generates a cyclic reference signal Vr with a cycle frequency Fr dependent on a input signal Vi. The input signal Vi and hence the reference signal represent a desired position of the auxiliary lens 17 relative to the main lens 15 (see FIG. 1). The resonant circuit 57, 55a is driven with a measurement current Im having the frequency Fm equal to the frequency Fr of the reference signal Vr. The control means comprises the high pass filter 42 to filter out a position signal Vp from the voltage Vm over the actuator coil 55a. The phase and the amplitude of the position signal Vp contain information about the actual inductance L of the actuator coil 55a and hence, about the actual position p. The position signal Vp and the reference signal Vr are fed to the phase detector 46 which outputs a signal Vphase which is proportional to the phase difference between Vp and Vr. This phase signal Vphase is passed through the loop filter 47 and the output of the loop filter 47 controls the drive current Id through the actuator coil 55a.

Figure 6:
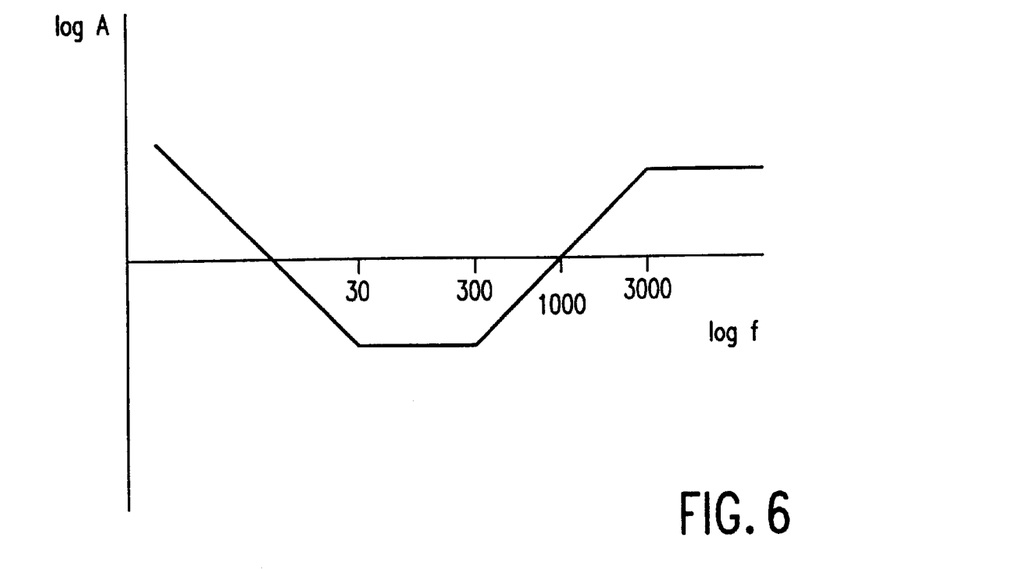
FIG. 6 shows the frequency characteristic of a loop filter.

FIG. 6 shows the frequency characteristic of the loop filter 47. The characteristic of the loop filter is designed according to known servo principles and is such that the actuator coil 55a is driven until the output Vphase of the phase detector 46 is zero.

Figure 7:
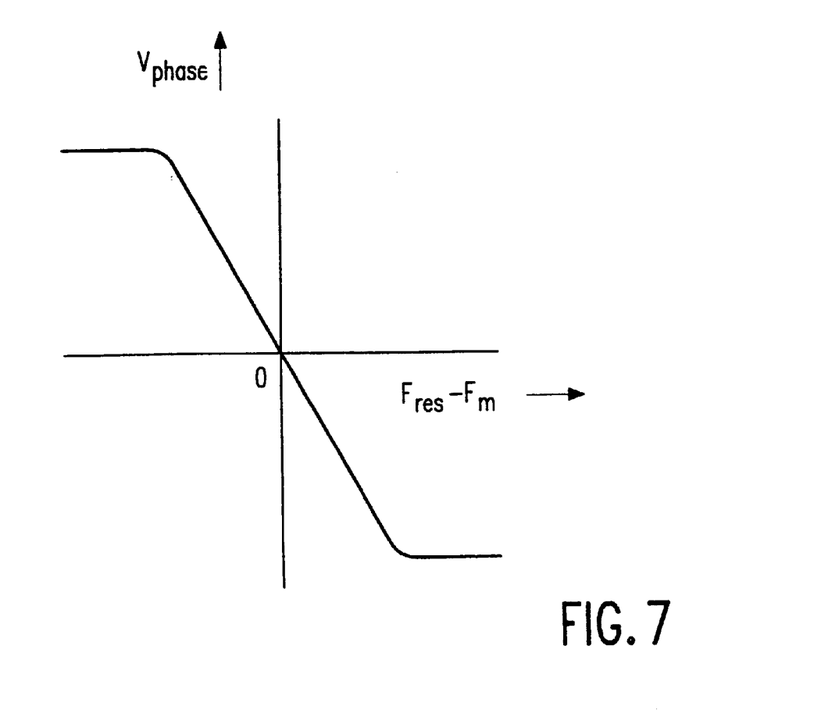
FIG. 7 shows the output of a phase detector as a function of the difference between the resonance frequency and the measurement frequency in the second embodiment and FIG. 8 shows the essential elements of a third embodiment of the apparatus according to the invention.

FIG. 7 shows the output Vphase of the phase detector 46 as a function of the difference between the resonant frequency Fres and the measurement frequency Fm. When Vphase is zero the current Im and the voltage variations due to Im are in phase which means that the resonant frequency Fres of the resonant circuit 55a, 57 is equal to the frequency Fm of the measurement current which is in turn equal to the frequency Fr of the reference signal Vr.

Hence, the servo loop in the second embodiment is conceived to adjust the position p in such a manner that the inductance L of the actuator coil 55a corresponds to a value at which the resonant frequency Fres of the resonant circuit equals the frequency Fr of the reference signal Vr. In this way the position of the auxiliary lens 17 can be adjusted by adjusting the frequency of the reference signal Vr.

Figure 8:
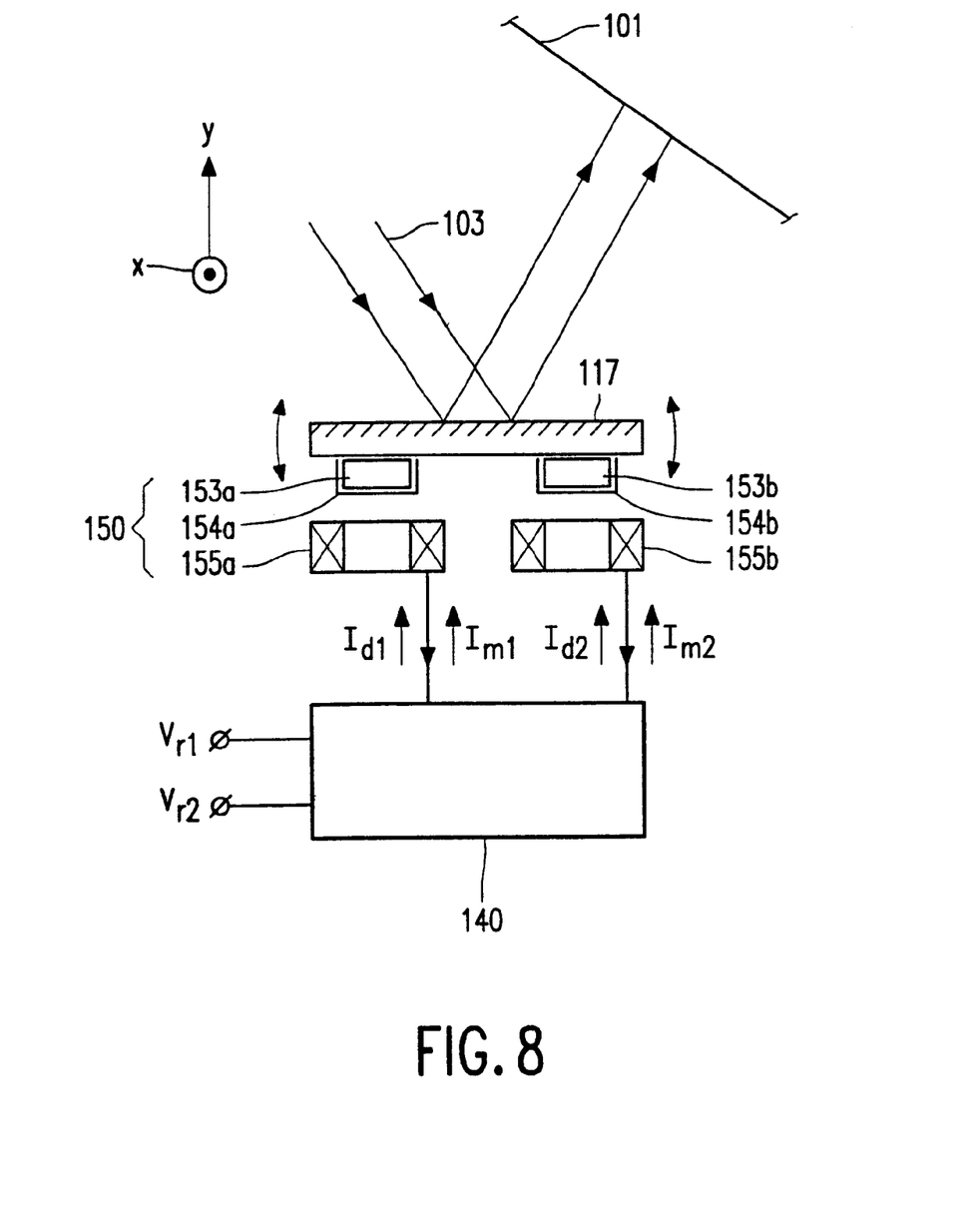

FIG. 8 shows the essential elements of a third embodiment of the apparatus according to the invention. It is an apparatus for reading information from a recording medium, in this case a document 101, which is to be scanned. The apparatus comprises a scan mirror 117 to scan the document with a laser beam 103. The laser beam 103 is generated by a laser (not shown) and can be detected after reflection in a similar way to that described with reference to FIG. 1. The apparatus comprises control means 140 to form two servo loops with the actuator 150 to position the scan mirror 117. The actuator 150 comprises two permanent magnets 153a and 153b which are shielded by copper foils 154a and 154b. The thickness of the copper foils is larger than the penetration depth corresponding to the cycle frequency of the cyclic measurement currents Im1 and Im2. The actuator coils 155a and 155b can be driven independently by drive currents Id1 and Id2 based on reference signals Vr1 and Vr2 with servo loops as disclosed with reference to FIGS. 1 to 8. Here, Vr1 represents a desired distance between the coil 155a and the copper foil 154a and Vr2 represents a desired distance between the coil 155b and the copper foil 154b. By means of the servo loops the scan mirror 117 can be positioned in the direction of the y-axis as well as in a direction of rotation about the x-axis.

It is to be noted that the invention is not limited to the embodiments shown herein. Various other embodiments are possible within the scope of the invention. For example, the scan element can also be a magnetic head which can be moved by means of the actuator in order to access different tracks on a magnetic tape. Further, the actuator may have a second coil or a second coil set instead of a permanent magnetic member. The inductance influencing means may have a different shape than a foil and may also be separate from a shield for shielding magnetic materials. The actuator coils 55b and 55c may be incorporated in additional servo loops so that the auxiliary lens can be tilted relative to the x-axis and the y-axis in order to compensate for comatic and/or astigmatic aberrations. The inductance of the actuator coil can also be detected without a resonant circuit or with a different resonant circuit. The inductance of the actuator coil can also be detected by driving the coil with a measurement voltage and detecting the phase difference between the measurement voltage and the resulting current through the actuator coil.

The invention has been disclosed with reference to specific preferred example embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

What is claimed is:

1. An apparatus for reading and/or writing information from/on a recording medium, comprising:
   a scan element for scanning the medium; and
   a servo loop for positioning the scan element, the servo loop including:
   an actuator for driving the scan element, the actuator having an actuator coil;
   a control means for feeding the actuator coil with a drive current dependent on a position signal which is indicative of the actual position of the scan element and a reference signal which is indicative of a desired position of the scan element; and
   an inductance influencing means to vary the inductance of the actuator coil as a function of the position of the scan element; and wherein the control means derive the position signal from the actual inductance of the actuator coil.

2. The apparatus of claim 1, in which the inductance influencing means include an electrically conductive and nonmagnetic material for reducing the inductance of the actuator coil when the inductance influencing means and the actuator coil approach each other.

3. The apparatus of claim 1, in which the control means measure the inductance of the actuator coil by feeding the actuator coil with a cyclic measurement current.

4. The apparatus of claim 3, in which:
   the apparatus further comprises a resonant circuit incorporating the actuator coil;
   the control means includes an oscillator for generating a measurement current having a frequency near the resonant frequency of the resonant circuit; and
   the control means includes a filter to filter a position signal from the voltage across the actuator coil.

5. The apparatus of claim 3, in which:
   the apparatus further comprises a resonant circuit incorporating the actuator coil;
   the resonant circuit is driven at the frequency of the reference signal; and
   the servo loop for positioning the scan element positions the scan element in such a manner that the resonant frequency of the resonant circuit approximates to the frequency of the reference signal.

6. The apparatus of claim 3, in which the frequency of the measurement current is at least ten times the cut-off frequency of the servo loop for positioning the scan element.

7. The apparatus of claim 3, in which the actuator comprises a magnetic member which is shielded by an electrically conductive and substantially non-magnetic shield from electromagnetic waves generated by the actuator coil as a result of the measurement current.

8. The apparatus of claim 7, in which the frequency of the measurement current is above 0.5 MHz.

9. The apparatus of claim 1, in which:
   the apparatus is an optical disk drive comprising a main lens for focusing a light beam on a information layer of an optical disk;
   the scan clement is an auxiliary lens for compensating for optical aberrations by adapting the position of the auxiliary lens relative to the main lens; and
   the actuator is operative between the main lens and the auxiliary lens.

10. The apparatus of claim 1, in which:
    the apparatus is a device for scanning the recording medium with a light beam; and
    the scan element includes a scan mirror for deflecting the light beam.

11. The apparatus of claim 1, in which:
    the inductance influencing means includes an electrically conductive and non-magnetic material for reducing the inductance of the actuator coil when the inductance influencing means and the actuator coil approach each other; the control means are for measuring the inductance of the actuator coil by feeding the actuator coil with cyclic measurement current;
    the frequency of the measurement current is at least ten times the cut-off frequency of the servo loop for positioning the scan element;
    the actuator comprises a magnetic,:member which is shielded by an electrically conductive and substantially non-magnetic shield from electromagnetic waves generated by the actuator coil as a result of the measurement current; and the frequency of the measurement current is above 0.5 MHz.

12. An actuator for an apparatus for reading and/or writing information from/on a recording medium, which actuator comprises:

an actuator coil; and a magnetic member, in which the magnetic member is shielded for an electromagnetic wave having a frequency in the range of 100 kHz to 10 MHz by means of a electrically conductive and substantially nonmagnetic material.

13. A controller for driving an actuator coil in order to position a scan element in an apparatus for reading and/or writing information from/on a recording medium, the controller comprising:

means for receiving a reference signal; and control means for feeding the actuator coil with a drive current dependent on a position signal-which is indicative of the actual position of the scan element and the reference signal; wherein the reference signal is indicative of the desired position of the scan element and wherein the control means derive the position signal from the actual inductance of the actuator coil.

* * * * *